United States Patent
Moon (10) Patent No.: US 7,862,722 B2
(45) Date of Patent: Jan. 4, 2011

(54) SEWAGE TREATMENT CONTROL DEVICE, METHOD, AND SEWAGE TREATMENT SYSTEM

(75) Inventor: Young Hak Moon, Seoul (KR)

(73) Assignee: Tai Wha Lease Industrial Co., Ltd., Seoul (KR)

( * ) Notice: Subject to any disclaimer, the term of this patent is extended or adjusted under 35 U.S.C. 154(b) by 413 days.

(21) Appl. No.: 12/142,405

(22) Filed: Jun. 19, 2008

(65) Prior Publication Data

US 2008/0314841 A1    Dec. 25, 2008

(30) Foreign Application Priority Data

Jun. 22, 2007   (KR) .................. 10-2007-0061878

(51) Int. Cl.
   *C02F 3/00*   (2006.01)
(52) U.S. Cl. .................. 210/614; 210/739; 210/746; 210/143
(58) Field of Classification Search .................. 210/614, 210/739, 746, 143

See application file for complete search history.

(56) References Cited

U.S. PATENT DOCUMENTS 6,535,795 B1 *   3/2003   Schroeder et al. ........... 700/266

* cited by examiner

*Primary Examiner*—Chester T Barry
(74) *Attorney, Agent, or Firm*—Christopher Paradies; Fowler White Boggs P.A.

(57) ABSTRACT

A sewage treatment control device, a method and a sewage treatment system, are disclosed. In one example, the sewage treatment control device includes measuring units having sensors for inspecting specific components in water, respectively; validity verification units connected to the measuring units to determine validities for measured component values, respectively; target value setting units connected to the validity verification units to set target values for the component values measured in the measuring units, respectively; a manual setting unit for setting a target value depending on a component value inputted by an operator; a signal selection unit for allowing either one of the respective target value setting units or the manual setting unit to be connected; a proportional-integral-derivative control unit for performing proportional, integral or derivative action for the target value inputted from the signal selection unit to convert the target value into a control signal; and a manipulation unit for manipulating a sewage treatment apparatus depending on the control signal converted in the proportional-integral-derivative control unit.

10 Claims, 9 Drawing Sheets

FIG. 1

PRIOR ART

FIG. 2

PRIOR ART

SEWAGE TREATMENT CONTROL DEVICE, METHOD, AND SEWAGE TREATMENT SYSTEM

FIELD OF THE INVENTION

The field relates to a sewage treatment control device, a method and a sewage treatment system. For example, the field relates to conditions where if an abnormal operation or failure of a measuring device for setting a water quality target value is detected, another measuring device may be used to set the water quality target value, and an improved sewage treatment apparatus may be used to reduce operational costs.

BACKGROUND OF THE INVENTION

As society has generally been developed, the quantity of water used has increased, and a sewage treatment apparatus has been used for treating the used water. In such a sewage treatment apparatus, a biological treatment process has been frequently used, and a physical-chemical treatment process, in addition to the biological treatment process, has been recently used.

This biological treatment process uses microorganisms to dissolve pollutant materials, and waste sludge may be generated when microorganisms are used to dissolve pollutant materials. Further, in the physical-chemical treatment process, chemicals are added and mixers or the like are used to mix the chemicals, so that pollutant materials can be quickly and efficiently removed. However, the physical-chemical treatment process is uneconomical because the continuous supply of chemicals, the increase of the generated sludge, the stirring operation, and the like result in the increase of treatment costs. Further, the physical-chemical treatment process is undesirable in that if the amount of chemicals is too small to remove pollutant materials, the removal efficiency of pollutant materials may be reduced, while if the amount of chemicals is too large, other pollutions may be generated due to the misappropriation of chemicals.

Meanwhile, although the biological treatment process may not quickly remove pollutant materials, there is an advantage in that the biological treatment process is stable, reliable and economical in a long-term view and does not generate another environmental pollution. Nevertheless, the biological treatment process leaves much room for improvement so far.

The conventional sewage treatment system receives water so that a state of the sewage treatment system may be changed into one of an anaerobic state, an anoxic state and an aerobic state, and the sewage treatment system includes a sewage treatment apparatus, which has a biological reactor whose a discharge portion is controlled to be opened/closed in order to change a flow path, and a sewage treatment control device for controlling the sewage treatment apparatus according to the set values.

The sewage treatment apparatus which is controlled by various processes as described above, controls the sewage treatment processes under different conditions depending on the water quality of the inflow sewage, so that the sewage treatment performance and the economic efficiency can be improved and another environmental pollution can be minimized.

The sewage treatment control device as described above has used a temporal control method in which on/off operation is repeated during a predetermined interval by means of PLC, DCS and PC control devices, a quantitative control method in which a constant target value is set for quantitative control, a manual control method in which a target value is manually controlled by an operator, or a programmable control method in which a given variable target value program is used for control.

When the constant target value is used to operate the sewage treatment control device, it is impossible to quickly cope with an external environmental change. Meanwhile, the manual control method in which the target value is manually controlled depends on the specialty of an operator. Accordingly, if the operator has no specialty, appropriate control is impossible and a sewage treatment process may be controlled under the subjective control condition of the operator.

Accordingly, a method for controlling a sewage treatment process has been recently used, in which a target value is appropriately set depending on a water quality load and a water quality state, and a variable target value is set by a given program.

Meanwhile, the conventional biological sewage treatment process does not effectively remove pollutant materials such as nitrogen and phosphorous in addition to BOD (Biological Oxygen Demand) and SS (concentration of suspended solids) because pollutant materials such as living wastewater, industrial wastewater and livestock wastewater have increased and secondary treatment facilities of the activated sludge method is limited, and therefore, the water pollution has been really going on.

Accordingly, apparatuses and methods for effectively removing pollutant materials such as nitrogen and phosphorous have been developed, and the methods are classified into a physical-chemical treatment method and a biological treatment method depending on their treatment manner.

The biological sewage treatment method includes an anaerobic zone, an anoxic zone, an aerobic zone, or the like, and may be represented as an $A^2/O$ method, an intermittent aeration method and an SBR method.

In the aforementioned $A^2/O$ series sewage treatment apparatus, internal partition walls are installed within a biological reactor to spatially separate the biological reactor into small chambers in order to identify an anaerobic (zone) state, an anoxic (zone) state and an aerobic (zone) state. The $A^2/O$ series sewage treatment apparatus is very useful for a large-scaled sewage treatment, is relatively resistant to load variations, and maintains a stably treated water quality which is over a predetermined level.

Figure 1:
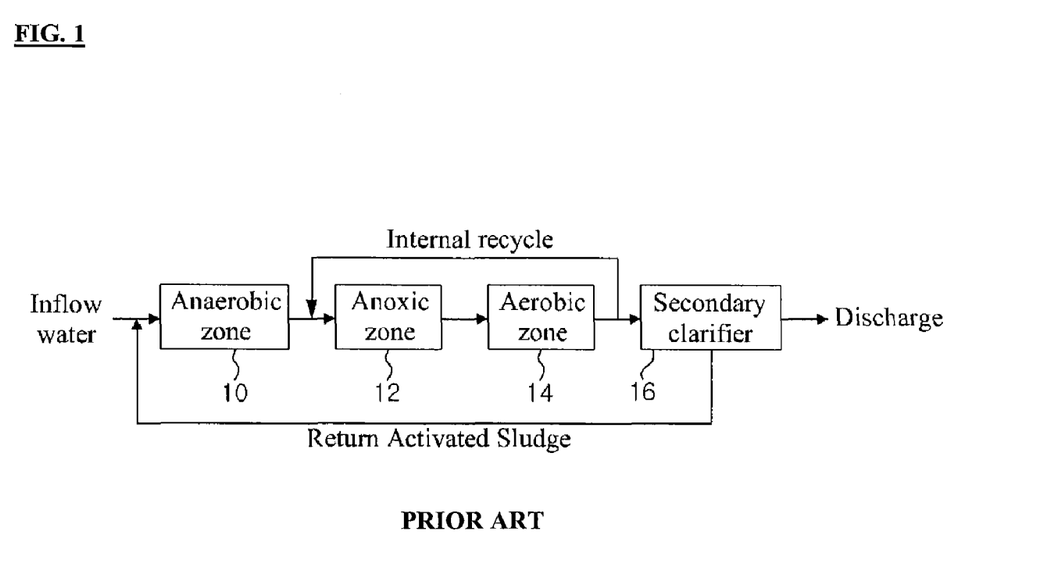
FIG. 1 is a flowchart of a conventional $A^2/O$ series sewage treatment apparatus.

Referring to FIG. 1, which is a flowchart of the conventional $A^2/O$ series sewage treatment apparatus, the conventional $A^2/O$ series sewage treatment apparatus allows inflow water, such as sewage and polluted waste water, which has been settled and treated in a primary clarifier to partially remove suspended solid materials, to be introduced into a biological reactor.

The internal portion of the biological reactor is divided into an anaerobic zone 10, an anoxic zone 12 and an aerobic zone 14 by partition walls. Further, the inflow water which has passed through the biological reactor is stored in a secondary clarifier 16, in which foreign materials are settled and then the water is discharged outward.

At this time, the sludge generated in the secondary clarifier 16 is reintroduced into the anaerobic zone, so that the retreatment process is performed.

Further, in order to improve the removal efficiency of nitrogen, ammonia nitrogen should be converted into nitrate nitrogen in the aerobic (zone) state, and then, an internal recycle pump or a propeller-type submarine transfer apparatus should be used to perform the internal recycle into the anoxic (zone) state.

As described above, the $A^2/O$ series sewage treatment apparatus separates the treatment stages from each other by the partition walls, whereas the intermittent aeration and SBR series sewage treatment apparatuses separately operate the anaerobic state, the anoxic state and the aerobic state via temporal control.

That is, the conventional intermittent aeration or SBR series sewage treatment apparatuses has one biological reactor, and is controlled to operate the biological reactor in the anaerobic state, the anoxic state and the aerobic state under different conditions with the passage of time, without requiring the internal recycle as described in the conventional $A^2/O$ series sewage treatment apparatus.

As such, the conventional sewage treatment methods identify the anaerobic state, the anoxic state and the aerobic state via the spatial or temporal separation (control), and are operated while the minimum dissolve oxygen concentration of 2.0 mg/L or more is maintained in the aerobic state. In addition, a mixer is installed in the biological reactor in the anoxic or anaerobic state, so that the contents therein may be completely mixed by a physical method, and if the internal recycle is performed, an internal recycle pump or the like is required.

Meanwhile, the operational control of the sewage treatment apparatus is mainly dependent on conditions, such as the inflow amount of sewage, a pollutant load in inflow sewage, and microorganism concentration in the biological reactor, and these conditions are determined by a flow rate measuring apparatus, a water quality measuring apparatus, an experimental value, and the like.

The inflow amount of sewage, which is most influential among these operational conditions of the sewage treatment apparatus, is highly fluid depending on time, day, month and season. Accordingly, if the sewage treatment apparatus is operated by a determined quantitative control condition, much time and budget may be wasted to maintain the normal operation, and thus, it is not easy to implement the normal operation. Further, since a change of operational conditions depending on experimental values causes an experiment procedure to be complicated and to require much time, it is difficult to cope with the conditions such as the flow rate and the pollutant load amount which are changed in real time. When a target value is manually determined, there is a problem in that a permanently stationed manager should adjust the target value depending on variable conditions.

Recently, although many automatic operational control methods using flow rate sensors and water quality measuring sensors have been developed, an error range in the measuring sensitivity of the water quality measuring sensors increases and frequency of maintenance occurrence for the sensors increases with the passage of time in comparison with their initial installment, so that there may be technical problems such as component replacement and periodic maintenance and economical problems such as component replacement and dual installment cost. As such, the operational control of the sewage treatment process depending on the sensors has not been really implemented.

Figure 2:
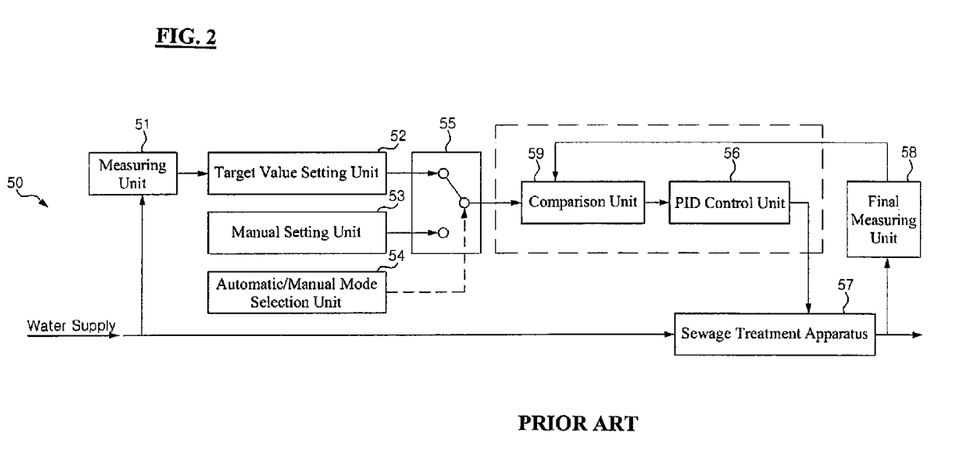
FIG. 2 is a block diagram schematically showing a conventional treatment control device.

FIG. 2 is a block diagram schematically showing a known sewage treatment control device of a sewage treatment system. Referring to FIG. 2, a sewage treatment control device 50 is equipped with a measuring unit 51, which has sensors for inspecting specific components in water, and the measuring unit 51 is connected to a target value setting unit 52. As the component values measured from the measuring unit 51 are input, the target value setting unit 52 sets target values of operational conditions required for the sewage treatment.

In addition to the method in which the sewage treatment control device 50 is automatically operated by the set values measured by the measuring unit 51, the sewage treatment control device 50 has a manual setting unit 53 in which a target value is set depending on a component value which is input by an operator. Further, the sewage treatment control device 50 is equipped with a signal selection unit 55 for selectively connecting either the target value setting unit 52 or the manual setting unit 53, and an automatic/manual mode selection unit 54 in which an operator may select either an automatic mode or a manual mode to select the signal selection unit 55. Further, the target value input from the signal selection unit 55 is transferred to a PID control unit 56 and is converted into a control signal by proportional, integral or derivative action. In addition, the PID control unit 56 is connected to a sewage treatment apparatus 57, and the sewage treatment apparatus 57 is manipulated depending on the converted control signal to treat the sewage.

Meanwhile, the sewage treatment control device 50 includes a control compensation unit in which the target value inputted from the signal selection unit 55 and the measured value measured from the water that has passed through the sewage treatment apparatus 57 are compared with each other and the target value to be inputted to the PID control unit 56 may then be compensated. The control compensation unit includes a final measuring unit 58, which has a sensor installed to an outlet side of the sewage treatment apparatus 57 to inspect a specific component of water, and a comparison unit 59, which is installed to an inlet side of the PID control unit 56 to compare the specific component value anticipated from the set target value and the specific component value inspected by the final measuring unit 58 and correct the target value so that the anticipated specific component value may be converged into the inspected specific component value.

Although the sewage treatment system configured as described above conventionally measures one specific component with one water quality measuring unit, a difference in sensitivity of the sensor may be generated as the water quality measuring unit has been operated for a long time. Accordingly, a measuring error and an economical problem such as maintenance occur.

In order to solve these problems, a scheme has been proposed in the conventional sewage treatment system, in which a plurality of water quality measuring units are installed, so that the measuring values between the water quality measuring units are compared with each other, or when there is a failure of one water quality measuring unit, the disabled water quality measuring unit may be replaced with another water quality measuring unit to measure the water quality. However, since the water quality measuring unit is expensive, the scheme has not been used as a realistic alternative scheme.

Accordingly, most sewage treatment systems conventionally used have not been used for a long time after the initial installation due to an increase of maintenance or incessant adjustments of the sensors. There is a problem in that it does not quickly cope with external factors such as extinction of microorganisms, a failure of the system, variations in flow rate of the inflow water and variations in the load amount, so that the function of the sewage treatment process may be lost.

Further, although the conventional sewage treatment system provides a monitoring and control system using the real-time water quality monitoring, it dose not provide a system which may check whether or not the monitoring and control system is abnormal, and therefore, the reliability for the monitoring and control system is considerably low. In addition, if the conventional sewage treatment plant is modified by an advanced treatment method, the period of time required to install partition walls and submarine machinery is so long that the treatment efficiency for the sewage treatment plant may be dramatically reduced during the construction period of time, thereby aggravating the pollutions in the neighboring rivers.

Further, in the conventional sewage treatment system, high dissolved oxygen concentration is maintained in an aerobic state and a mixer is installed and continuously operated in an anaerobic or anoxic state, large operational cost is necessary to operate the sewage treatment apparatus.

Therefore, there exists a need for the improvement of the sewage treatment apparatus in the conventional sewage treatment system as well as the fundamental improvement of the control method for controlling the sewage treatment apparatus.

SUMMARY OF THE INVENTION

An object is to provide a sewage treatment control device and method and a sewage treatment system using the same, in which one may appreciate abnormality or not of a measured value that may occur when a sensor in a measuring unit is abnormally operated, when an expensive measuring unit for measuring a specific component is out of order, an inexpensive measuring unit for measuring another specific component may be used to convert a target value to thereby replace the expensive measuring unit with the inexpensive measuring unit and thus dramatically reduce the installation cost for the measuring units. Another object is to minimize the number of measuring units in order to easily perform the maintenance. Another object is to minimize occurrence of failure; and although any one of the measuring units is out of order, another measuring unit may be used to perform the continuous measurement, so that there is no need for manual operation, thereby allowing for safely and precisely controlling a sewage treatment process.

Further, another object is to provide a sewage treatment control device, a method and a sewage treatment system which may be commonly applied to a sewage treatment process, wherein the best control conditions may be implemented; the removal efficiency of nitrogen and phosphorous may be improved; and the maintenance time and manpower may be minimized to reduce a related budget.

According to an example of sewage treatment control device for achieving the objects, there is provided a sewage treatment control device, which comprises measuring units having sensors for inspecting specific components in water, respectively; validity verification units connected to the measuring units to determine validities for measured component values, respectively; target value setting units connected to the validity verification units to set target values for the component values measured in the measuring units, respectively; a manual setting unit for setting a target value depending on a component value inputted by an operator; a signal selection unit for allowing either one of the respective target value setting units or the manual setting unit to be connected; a PID control unit for performing proportional, integral or derivative action for the target value inputted from the signal selection unit to convert the target value into a control signal; and a manipulation unit for manipulating a sewage treatment apparatus depending on the control signal converted in the PID control unit.

Here, the validity verification unit determine the validities by comparing whether the signals for the measured component values satisfy a predetermined voltage, a predetermined variation range, a predetermined variation rate or the variation number in a predetermined period of time. Further, it is preferably that the target values be operational conditions set to treat sewage depending on the measured component values. Furthermore, the signal selection unit include a selection logic unit which controls to allow one of the target value setting units, which has a component value determined to be valid in the respective validity verification units, or the manual setting unit to be connected. Moreover, the selection logic unit may control to select one of the target value setting units depending on a predetermined priority ranking.

According to one example, there is provided a sewage treatment control method, which comprises the steps of inspecting specific components of water; determining validities for component values measured in the inspection step; setting target values for the component values; selecting a target value for a component value determined to be valid in the step of determining validities; converting the target value selected in the selecting step into a control signal; and manipulating a sewage treatment apparatus depending on the control signal converted in the converting step.

Here, the inspecting step may be performed by respective sensors for inspecting the specific components of water. In addition, the step of setting target values may be performed by setting operational conditions for sewage-treating the specific components inspected in the inspection step. Further, in the step of determining validities, the validities may be determined by comparing whether the signals for the measured component values satisfy a predetermined voltage, a predetermined variation range, a predetermined variation rate or the number of variations in a predetermined period of time.

According to another example, there is provided a sewage treatment system, which comprises a sewage treatment apparatus and a sewage treatment control device. The sewage treatment apparatus includes at least two biological reactors, each of the biological reactor being respectively connected to inflow and discharge portions, the biological reactor being formed with a channel for allowing one to communicate with the other; diffusers installed to lower portions of the respective biological reactor to selectively supply air so that each biological reactor is changed into one of an anaerobic zone state, an anoxic state and an aerobic state; and water level adjustment devices respectively installed to the discharge portions of the biological reactor to adjust closing/opening of the discharge portions to change a flow path. The sewage treatment control device includes measuring units having sensors for inspecting specific components in water, respectively; validity verification units connected to the measuring units to determine validities for measured component values, respectively; target value setting units connected to the validity verification units to set target values for the component values measured in the measuring units, respectively; a manual setting unit for setting a target value depending on a component value inputted by an operator; a signal selection unit for allowing either one of the respective target value setting units or the manual setting unit to be connected; a PID control unit for performing proportional, integral or derivative action for the target value inputted from the signal selection unit to convert the target value into a control signal; and a manipulation unit for manipulating the sewage treatment apparatus depending on the control signal converted in the PID control unit.

One advantage is that installation cost for utilizing measuring unit is dramatically reduced. Another advantage is that the number of measuring units to perform the maintenance may be minimized. Yet another advantage is that occurrence of failure may be minimized. Still another advantage is that a sewage treatment process maybe safely and precisely controlled.

DETAILED DESCRIPTION

The examples described and drawings rendered are illustrative and are not to be read as limiting the scope of the invention as it is defined by the appended claims.

Hereinafter, preferred embodiments according to the sewage treatment control device, method and system will be described in detail with reference to the accompanying drawings.

Figure 3:
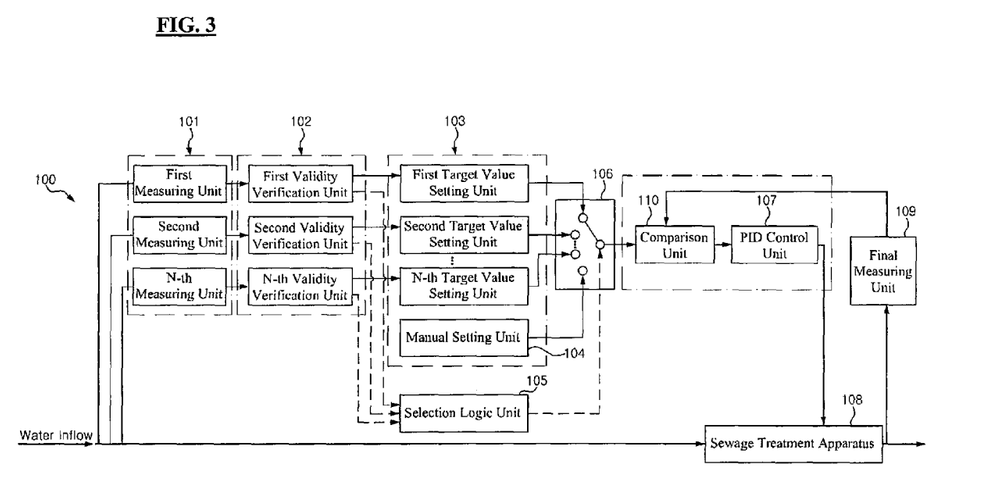
FIG. 3 is a block diagram schematically showing an example of a sewage treatment control device.
Figure 4:
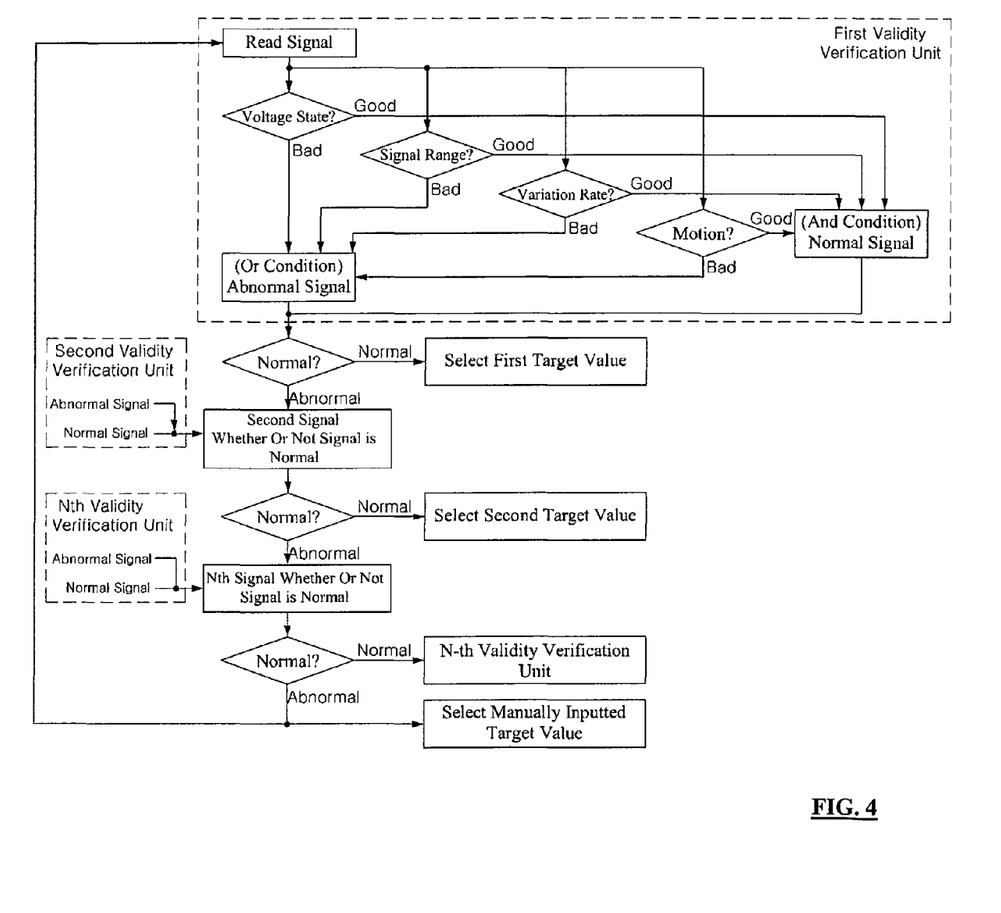
FIG. 4 is a flowchart showing a process for determining validities in the sewage treatment control device according to one example.

FIG. 3 is a block diagram schematically showing an example of sewage treatment control device of a sewage treatment system; and FIG. 4 is a flowchart showing a process for determining validities in the sewage treatment control device of the sewage treatment system according to one example.

The sewage treatment system according to one example comprises a sewage treatment apparatus 108 including biological reactor, wherein water is introduced into the biological reactor, their states are changed into one of an anaerobic zone state, an anoxic state and an aerobic state, and closing/opening of discharge portions of the biological zones are adjusted in order to change a flow path; and a sewage treatment control device 100, which determines validities for component values measured for specific components of the water to set target values and controls the sewage treatment apparatus by generating control signals which are in proportional to the target values.

Here, the sewage treatment control device 100 has measuring units 101 for inspecting the specific components of the water, respectively. The number of the measuring units 101 is provided corresponding to the specific components of the water to be measured, and sensors provided in the respective measuring units 101 are used to separately inspect the respective specific components. For example, the respective measuring units 101 may measure dissolved oxygen (DO), nitrate ($NO_3$), ammonia ($NH_4$), phosphate ($PO_4$), mixed liquor-suspended solid (MLSS) concentration, air flow rate and air pressure, water level or sludge interface, turbidity, pH, and the like. Herein, the dissolved oxygen may be used to measure the amount of oxygen required to react an ammonia material in order to remove sewage pollutant material with microorganisms. Further, the nitrate may be used to measure reactant of ammonia nitrogen which has been treated by microorganisms. Furthermore, the mixed liquor suspended solid refers to suspended solid which is included in the sewage to be treated and may be used to measure concentration of microorganisms in a sewage treatment process. In addition, the measuring units 101 may measure temperature of water, biochemical oxygen demand (BOD), chemical oxygen demand (COD), oxidation-reduction potential (ORP), and the like.

In addition, the measuring units 101 are connected to validity verification units 102, respectively. The validity verification units 102 determine validities of the component values measured in the measuring units 101.

The validity verification units 102 determine whether or not signals of the measured component values are activated with a predetermined voltage or whether or not a variation range of the measured component values is included within a predetermined range. Further, the validity verification units 102 determine the validity by determining the variation rates of the measured component values, and may determine whether or not the sensors are normally operated through the variation numbers during a predetermined period of time.

In addition, the validity verification units 102 are connected to target value setting units 103, respectively, in which target values for the component values measured in the respective measuring units 101 are set.

In the target value setting units 103, the target values for the component values to be inputted have been previously set with functional relationships. For example, if the component value for ammonia ($NH_4$) is inputted, the target value setting units 103 can obtain the target value for the dissolved oxygen (DO). Here, the target value function for $NH_4$ may be expressed as Chemical Formula 1:

$$NH_4 + O_2 \rightarrow NO_3 \qquad \text{Chemical Formula 1}$$

That is, if the component value for $NH_4$ is inputted, the component value for $O_2$ required to be chemically changed into $NO_3$ (nitrate) can be obtained. On the other hand, if the component value for $NO_3$ is inputted, the component value for $O_2$ required to change $NH_4$ can be obtained.

As described above, an alternative function for a specific component may be used, e.g., oxygen uptake rate (OUR) can be calculated by using BOD and MLSS input flow rate, and therefore, DO can be measured.

The setting principle by which the target values may be replaced will be described later.

The nitrification reaction is a process in which ammonia nitrogen is oxidized into nitrous acid and nitric acid by nitrification microorganisms in an aerobic condition, and it is classified into an ammonia oxidation process and a nitrous acid oxidation process, which are expressed as Chemical Formula 2:

$$NH_4^+ + 1.5O_2 \rightarrow NO_2^- + H_2O + 2H + Energy$$

$$NO_2^- + 0.5O_2 \rightarrow NO_3^- + Energy \qquad \text{Chemical Formula 2}$$

where the theoretical total oxygen demand required to oxidize ammonia into nitric acid is about 4.57 g-$O_2$/g-N, among which the amounts of oxygen required in the ammonia oxidization process and the nitrous acid oxidization process are 3.43 g-$O_2$/g-N and 1.14-$O_2$/g-N, respectively. At this time, nitrification microorganisms use carbonic acid gas in wastewater as an inorganic carbon source, and the hydrogen ion ($H^+$) generated through the nitrification process will cause alkalinity in wastewater to be reduced. Theoretically, alkalinity of 7.14 mg (as $CaCO_3$) may be required to oxidize 1 mg $NH_4^+$—N.

In the nitrification reaction, inorganic carbon is required during a cellular synthesis process. At this time, most energy obtained from the oxidation of nitrogen is used to deoxidize carbon dioxide into a cell. The stoichiometrical formula in which the cellular synthesis is considered can be expressed as Chemical Formula 3:

$$1NH_4^+ + 1.44O_2 + 0.0496CO_2 \rightarrow 0.99NO_2^- + 0.01C_5H_7NO_2 + 0.97H_2O + 1.99H^+$$

$$1NO_2^- + 0.5O_2 + 0.031CO_2 + 0.00619NH_4^+ + 0.0124H_2O \rightarrow 1NO_3^- + 0.00619C_5H_7NO_2 + 0.00619H^+$$

where yields of the ammonia oxidizer and the nitrite oxidizer are applied as 0.08 g-VSS/g-$NH_4^+$—N and 0.05 g-VSS/g-$NO_2^-$—N, respectively. Here, $C_5H_7NO_2$ refers to *nitrosomonas*.

Generally, it is well known that the nitrification reaction is principally caused by chemoautotrophic bacteria. *Nitrosomonas* sp. among the microorganisms related to the nitrification reaction is a representative microorganism by which ammonia is oxidized through hydroxylamine into nitrous acid, and there are other microorganisms such as *Nitrosospira briensis*, *Nitrosococcus nitrous* and *Nitrosolobus multiformis*. The principal microorganism for oxidizing nitrous acid into nitric acid is *Nitrobacter* sp., and it is also known that there are marine microorganisms such as *Nitrosospina gracilis* and *Nitrosococcus mobils*.

As described above, since the reaction related to a nitrification process occurs in a field reactor (in an aeration state), the control relationship and flow is analogized to be a simplified reaction formula such as '$NH_4$ amount+$O_2$ amount→$NO_3$ amount', so that the object to be controlled is $O_2$ (or dissolved oxygen (DO)) and the relationship parameters required for the control are $NH_4$ and $NO_3$.

Further, by the quantitative chemical reaction relationship, ammonia ($NH_4$) (i.e., the reaction amount), oxygen (i.e., the required amount) and nitrate (i.e., the production amount) may measure a state (quantitative reaction amount) of the reactor by installing $NH_4$, $NO_3$ and DO measuring units in a control system, and the oxygen amount to be required during the aeration process can be estimated by the measured $NH_4$ and $NO_3$.

Moreover, since the reaction flows from the left side to the right side in the reaction formula, mutual inverse proportional operation occurs between $NH_4$ and $NO_3$ according to the reaction formula corresponding to the consumption and the production relationship. That is, $O_2$ consumption reaction over time causes $NH_4$ to be reduced and $NO_3$ to be increased.

According to the mutual reaction relationship, the required $O_2$ demand may be set by $NH_4$ and $NO_3$. A load curve for the DO demand is proportional to $NH_4$, while a load curve for the DO demand is inversely proportional to $NO_3$.

Although the respective load curves are theoretically linear, they are non-linearly proportional due to real operational conditional parameters such as season, time, load, water-material component ratio, microorganism activity, water temperature and climate. Further, the respective non-linear proportional curves are plotted with reference to data obtained from various empirical operations or initial trial runs for the sewage introduced into a sewage treatment plant.

Further, the sewage treatment control device 100 may automatically set the target values based on the component values inspected by the respective measuring units 101 as described above. The sewage treatment control device 100 may cause the operator to set the target values voluntarily if there are dramatic conditional changes such as a failure of the sewage treatment control device 100 or a climate flood. To this end, a manual setting unit 104 for causing an operator to input the component values directly may be included.

Meanwhile, the sewage treatment control device 100 includes a signal selection unit 106 for selectively allowing either one of the respective target value setting units 103 or the manual setting unit 104 to be connected. The signal selection unit 106 includes a selection logic unit 105 for controlling either one of the target value setting units 103, which has a component value determined to be valid in the respective validity verification units, or the manual setting unit 105 to be connected.

The selection logic unit 105 selects one of target value setting units 103 whose validity is verified depending on a predetermined priority ranking. That is, the selection logic unit 105 inspects a first component value designated as a first priority ranking according to a sequential logic and if there is no abnormality, selects the first component value. However, if the first component value designated as the first priority ranking is abnormal, the selection logic unit 105 inspects and selects a second component designated as a second priority ranking. As described above, the selection logic unit 105 inspects the respective component values depending on its priority ranking, and if all the component values are abnormal, the target value is set depending on the setting value inputted by an operator into the manual setting unit 104.

Further, the sewage treatment control device 100 includes a PID control unit 107 for performing proportional, integral or derivative action for the target value input from the signal selection unit 106 to convert the target value into a control signal. In addition, the sewage treatment control device 100 may further include a control compensation unit in which the target value inputted from the signal selection unit 106 and the measured value obtained by measuring from the water which has passed through the sewage treatment apparatus 108 are compared with each other and then the target value to be inputted to the PID control unit 107 may be compensated.

The control compensation unit includes a final measuring unit 109, which has a sensor installed to the outlet side of the sewage treatment apparatus 108 to inspect a specific component of the water, and a comparison unit 110, which is installed to the inlet side of a PID control unit 107 and compares the specific component value anticipated from the set target value and the specific component value inspected by the final measuring unit 109 to correct the target value so that the anticipated specific component value is converged to the inspected specific component value.

As described above, the sewage treatment control device 100 is capable of rapidly coping with the occurrence or not of any problem, an environmental change or processing situation due to newly inflow water, and an external environmental change, so that the stably treated water quality can be maintained as well as the operational cost can be largely reduced.

The configuration and operation of the sewage treatment apparatus which is controlled by the sewage treatment control device 100 as described above will be described as follows.

Figure 5:
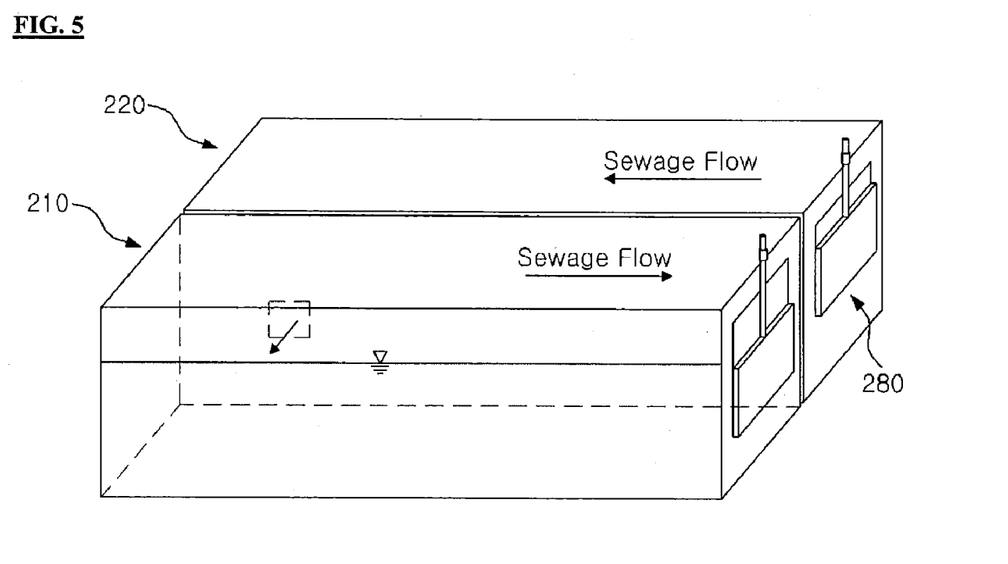
FIG. 5 is a perspective view schematically showing a biological reactor according to one example.

FIG. 5 is a perspective view schematically showing a biological reactor according to one example. In addition, FIG. 6 is a view schematically showing the configuration of a sewage treatment apparatus according to one example, and FIG. 7 is a sectional view showing an interior of the biological reactor of the sewage treatment apparatus according to one example.

Figure 6:
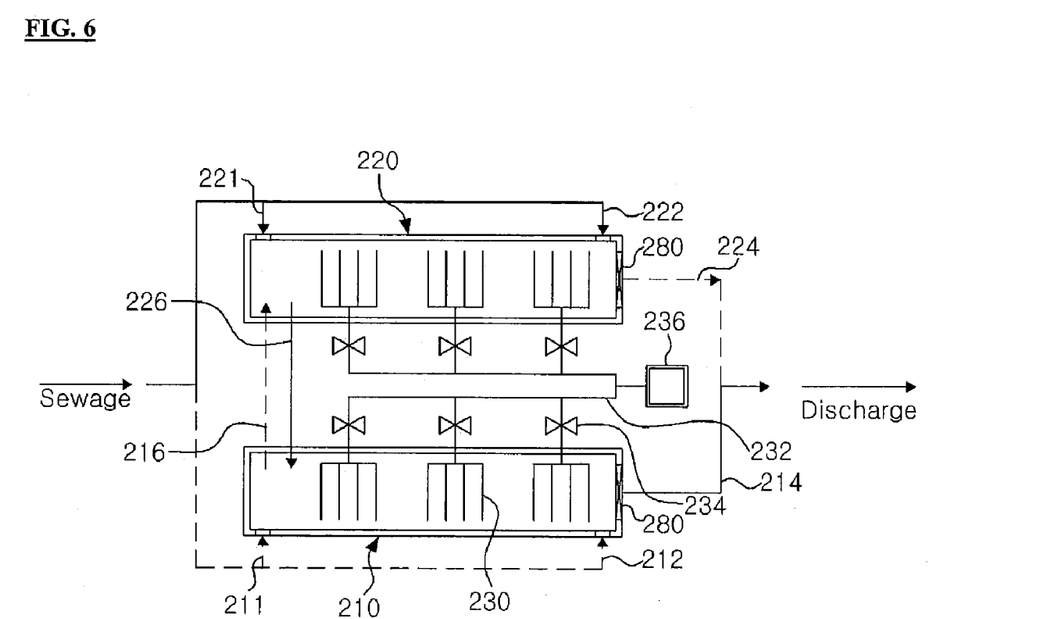
FIG. 6 is a view schematically showing the configuration of a sewage treatment apparatus according to one example.
Figure 7:
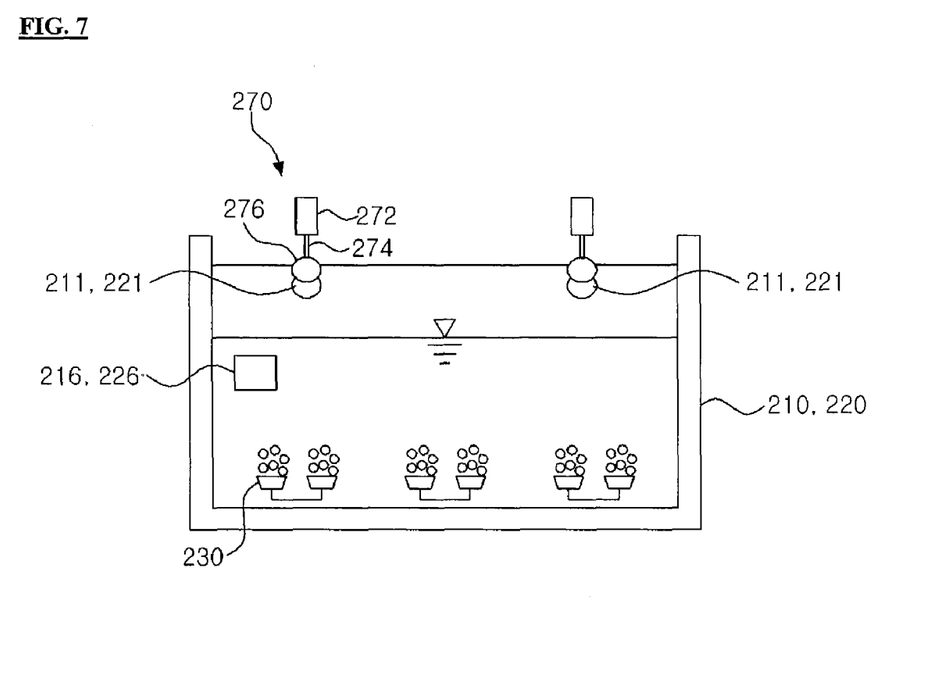
FIG. 7 is a sectional view showing an interior of the biological reactor of the sewage treatment apparatus according to one example.

As shown in FIGS. 5 to 7, the sewage treatment apparatus 108 is provided with two biological reactors 210 and 220 (for bulk liquid), which are formed with channels 216 and 226 through which the biological reactors 210 and 220 communicate with each other and the sewage may flow to each other. In addition, the respective biological reactors 210 and 220 are connected to inflow portions 211, 212, 221 and 222 for causing the sewage to be introduced through upper and lower ends of the biological reactors 210 and 220 and discharge portions 214 and 224 for discharging the sewage which is purified through the respective biological reactors 210 and 220. To this end, the biological reactors 210 and 220 are provided with inflow and discharge ports to be connected to the inflow portions 211, 212, 221 and 222 and the discharge portions 214 and 224, respectively.

Further, the inflow portions 211, 212, 221 and 222 are connected to the upper and lower ends of the biological reactors 210 and 220, respectively. Opening and closing units 270 are installed to outlet portions of the inflow portions 211, 212, 221 and 222, so that an open state of the discharge portions 214 and 224 can be adjusted by the control of the opening and closing units 270.

Each of the opening and closing units 270 is an electric-powered water gate, and includes a cylinder 272 provided with a vertically moved rod 274, and a shielding plate 276 connected to the rod 274 of the cylinder 272 to shield the outlet portion of the inflow portion 211, 212, 221 or 222.

Further, diffusers 230 for supplying air are installed to a lower portion of each biological reactor 210 or 220. The diffuser 230 selectively supplies air into the biological reactor 210 or 220, and accordingly, the biological reactor 210 or 220 can be changed to be one of an anaerobic zone state, an anoxic state and an aerobic state. In addition, the anaerobic zone state, the anoxic state and the aerobic state may coexist in the biological reactor 210 or 220 by controlling the injection position of air to be supplied from the diffuser 230.

Further, a plurality of diffusers 230 may be installed. It is preferable that the diffusers 230 be installed to face the inflow portions 211, 212, 221 and 222. Accordingly, the respective diffusers 230 are positioned at the lower portions of the corresponding inflow portions 211, 212, 222 and 222.

In addition, a main air supply piping 232 for supplying air is connected to the diffuser 230, and a blower 236 is installed to the main air supply piping 232 to supply air. Further, a valve means 234 for adjusting the amount of the supplied air is installed to a connection portion between each diffuser 230 and its main air supply piping 232. The valve means 234 may include an electric needle valve, an electric butterfly valve or an electric ball valve, and the adjustment of the valve means 234 may cause the amount of air supplied to each diffuser 230 to be controlled. Accordingly, the sewage treatment apparatus 108 may block or adjust the supply of air to be supplied to respective portions of the biological reactors 210 and 220 through the diffusers 230 without suspending the operation of the blower 236.

Moreover, a flow rate adjustment zone (not shown) for adjusting the flow rate of the supplied sewage water may be installed to inlet portions of the inflow portions 211, 212, 221 and 222 of the biological reactors 210 and 220. Accordingly, a constant flow rate of the sewage water may be supplied to the biological reactors 210 and 220.

Further, water level adjustment devices 280 for adjusting the closing/opening of the discharge portions 214 and 224 to change the flow path are installed to the discharge portions 214 and 224 of the biological reactors 210 and 220. Accordingly, the adjustment of the water level adjustment device 280 in the biological reactors 210 and 220 may cause the nitrated sewage in the anoxic (zone) state to gravitationally flow, and therefore, an internal recycle effect can be obtained with a relatively small power.

The water level adjustment device 280 is to adjust the closing/opening of the discharge portions 214 and 224 by adjusting the opened height of the discharge portions 214 and 224, and changes the flow path by adjusting the flow rate where the discharge portions 214 and 224 overflows. To this end, the water level adjustment device 280 includes a closing/opening means for closing its opening and a height adjustment means for adjusting the height of the closing/opening means.

Figure 8:
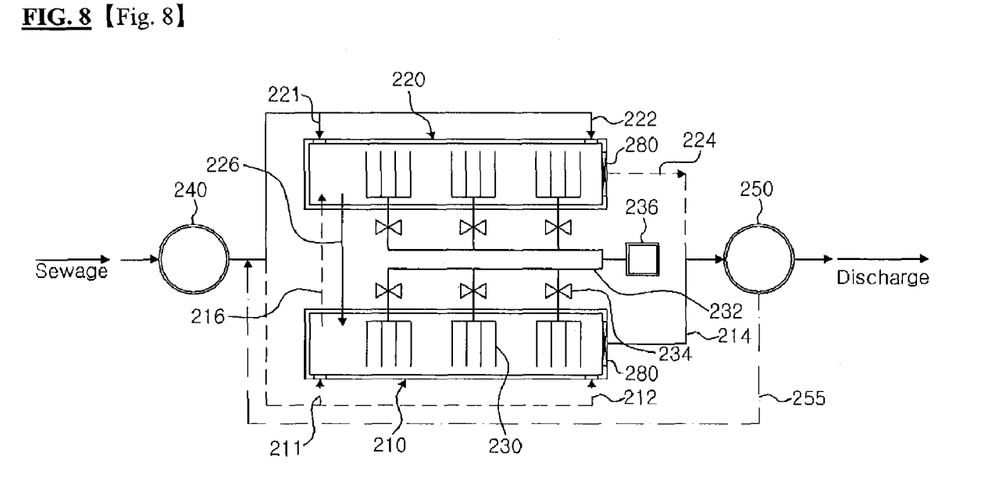
FIG. 8 is a view of the configuration of a modified embodiment of the sewage treatment apparatus according to one example.

FIG. 8 is a view of the configuration of a modified embodiment of the sewage treatment apparatus 108 according to one example. A primary clarifier 240 for primarily clarifier foreign materials included in the inflow sewage water may be installed between the flow rate adjustment zone and the inlet portion of the inflow portions 211, 212, 221 and 222. Further, a secondary clarifier 250 for secondarily clarifier foreign materials included in the treated sewage may be installed to the discharge portions 214 and 224 of the biological reactors 210 and 220. Here, a plurality of primary clarifier 240 and a plurality of secondary clarifier 250 may be installed in order to increase the settling performance of foreign materials.

Meanwhile, the secondary clarifier 250 is equipped with a return channel 255 for allowing the secondary clarifier 250 to communicate with the inflow portions 211, 212, 221 and 222 of the biological reactors 210 and 220 is, so that the return channel 255 causes a portion of the sludge settled in the secondary clarifier 250 to be fed back through the inflow portions 211, 212, 221 and 222 to the biological reactors 210 and 220 and retreated therein.

Figure 9:
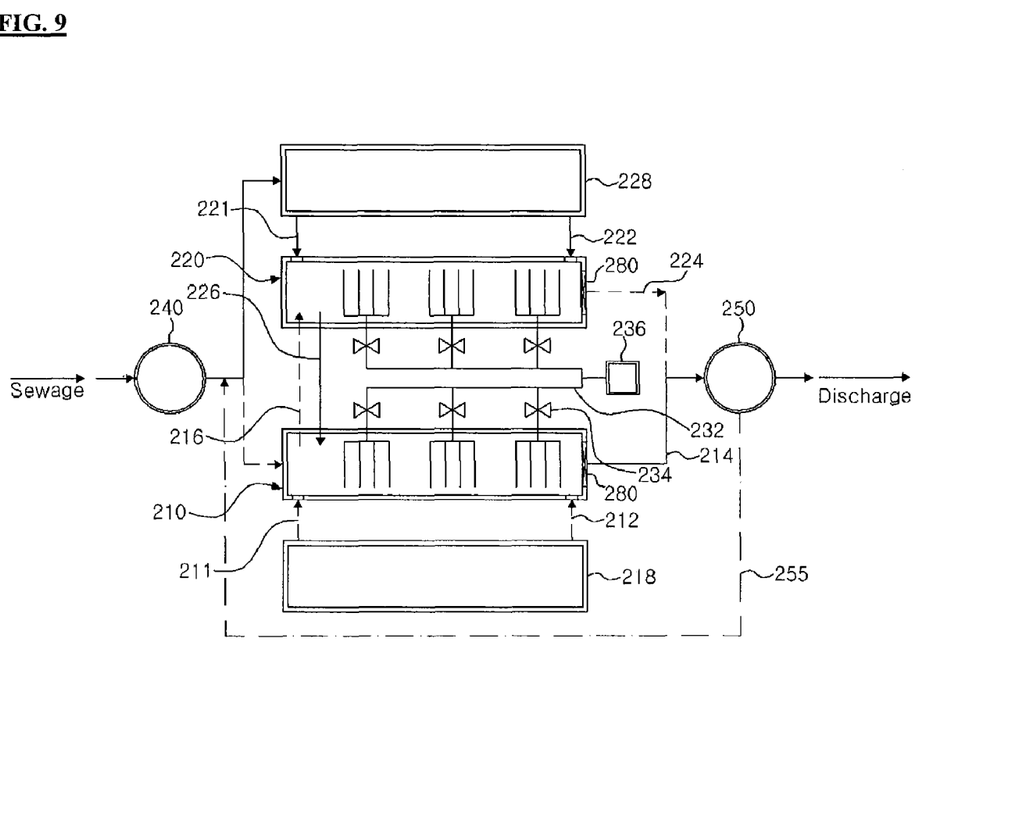
FIG. 9 is a view showing the configuration of a sewage treatment apparatus according to another embodiment.

As shown in FIG. 9 which is a view showing the configuration of a sewage treatment apparatus 108 according to another embodiment, auxiliary anaerobic zones 218 and 228, into which the inflow sewage and the sludge fed back from the return channel 255 are introduced, may be installed at front ends of the biological reactors 210 and 220, respectively. The auxiliary anaerobic zones 218 and 228 for mixing and supplying the sewage and the sludge may preferably be equipped with a mixer for physically stirring the sewage and the sludge.

In one example, the auxiliary anaerobic zones 218 and 228 may be installed to the sides of the biological reactors 210 and 220, respectively, and one auxiliary anaerobic zone may be installed to the front ends of the biological reactors 210 and 220 to allow the sewage and the sludge to be mixed and supplied in a mixed state.

Figure 10:
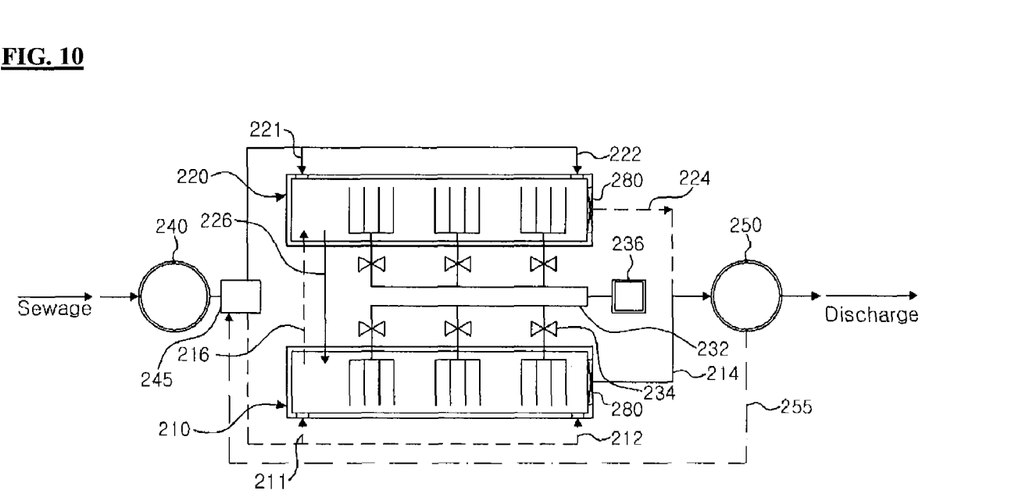
FIG. 10 is a view showing the configuration of a sewage treatment apparatus according to a further embodiment.

In addition, referring to FIG. 10 which is a view showing the configuration of a sewage treatment apparatus according to a further embodiment, instead of the aforementioned auxiliary anaerobic zones 218 and 228, a mixing and distributing zone 245 for mixing and distributing the inflow sewage and the return activated sludge may be installed to the front ends of the biological reactors 210 and 220. A plurality of mixing and distributing zones 245 may be installed, so that the inflow sewage water and the return activated sludge may be properly mixed and distributed.

Figure 11:
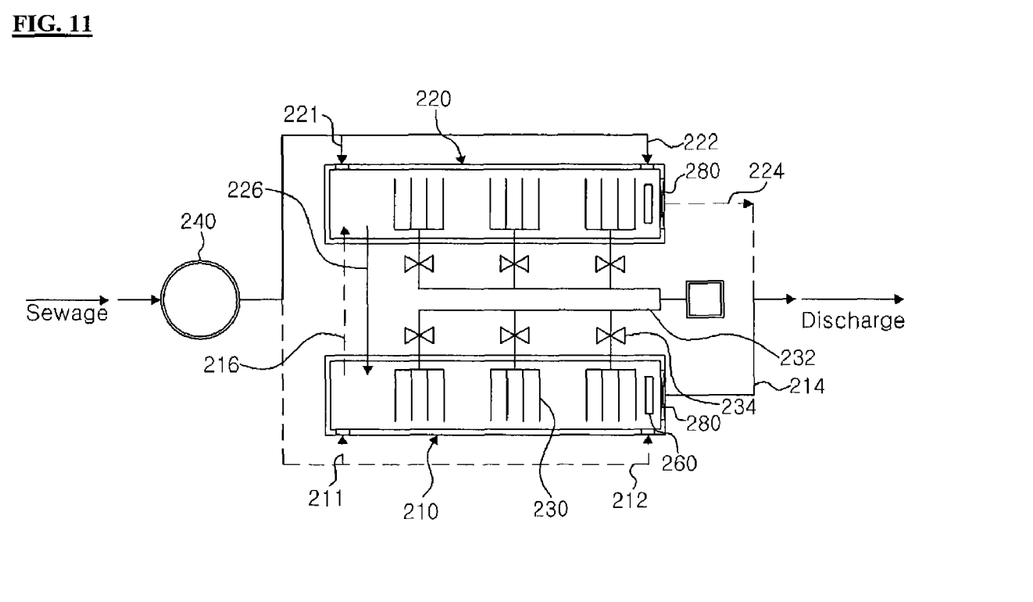
FIG. 11 is a view showing the configuration of a sewage treatment apparatus according to a still further embodiment.

Further, as shown in FIG. 11, the sewage treatment apparatus 108 may further include filter units 260 within the biological reactors 210 and 220, respectively. The filter unit 260 is composed of a membrane film and used to filter foreign materials contained in the sewage to be discharged to thereby prevent foreign materials from being discharged through the discharge portions 214 and 224. Accordingly, if the filter units 260 are installed in the biological reactors 210 and 220, settled materials are not included in the sewage to be discharged, so that the additional secondary clarifier (reference numeral 250 in FIGS. 8 to 10) for settling foreign materials may not be installed. Here, although it is shown in FIG. 11 that a space is formed between the filter unit 260 and the outlet portions of the biological reactors 210 and 220, this is to show the configuration of the filter unit 260, and accordingly, the filter unit 260 and the outlet portions of the biological reactors 210 and 220 may be in contact with each other.

Further, according to one example, the sewage treatment apparatus 108 is provided with a control system which may quickly and flexibly cope with the external environment and the inflow load amount.

The control system is divided into a water quality monitoring control system and a tuning system. The water quality monitoring control system analyzes data in real time according to a control logic which is previously inputted, and manages and controls the respective control portions. Also, the tuning system is allowed to receive and diagnose the data and operational results inputted to the water quality monitoring control system, and monitors and determines whether or not the operation according to the aforementioned control logic is reasonable. Further, the tuning system performs self simulation using the input data to implement the understanding for the current operation state and the anticipation. Further, after the data has been reviewed, the tuning system analyses the reviewed result to construct a new control logic, transmits the new control logic back to the water quality monitoring control system, and hereafter allows the water quality monitoring control system to be operated by the new control logic.

As described above, the tuning system is capable of rapidly coping with the occurrence or not of any problems, environmental change or treatment status due to newly inputted water quality, and external environmental change, so that the stably treated water quality can be maintained as well as the operational cost can be largely reduced.

To this end, a measuring sensor for analyzing water quality is installed in each of the biological reactors 210 and 220, and the data transmitted by the measuring sensor for analyzing the water quality is inputted to the water quality monitoring control system.

At this time, the water quality monitoring control system inputs the date to the programmed control logic to automatically control a sector-based state change, a change of the positions through which the sewage and the sludge are introduced, the adjustment of the return rate for the sludge, the adjustment of the inflow amount of sewage, and a sector-based appropriate dissolved oxygen concentration in the aerobic sectors in the biological reactors 210 and 220.

Further, the water quality monitoring control system transmits the inputted data and the resulting values to the tuning system.

The tuning system monitors the operational state of the water quality monitoring control system according to the data inputted to the water quality monitoring control system and the resulting values to thereby prevent abnormal operation. Further, the tuning system performs a simulation for anticipating the operation of the sewage treatment apparatus 108 according to the inputted data and the resulting values, accordingly diagnoses and estimates the current state, and then extracts an appropriate control logic.

Figure 12:
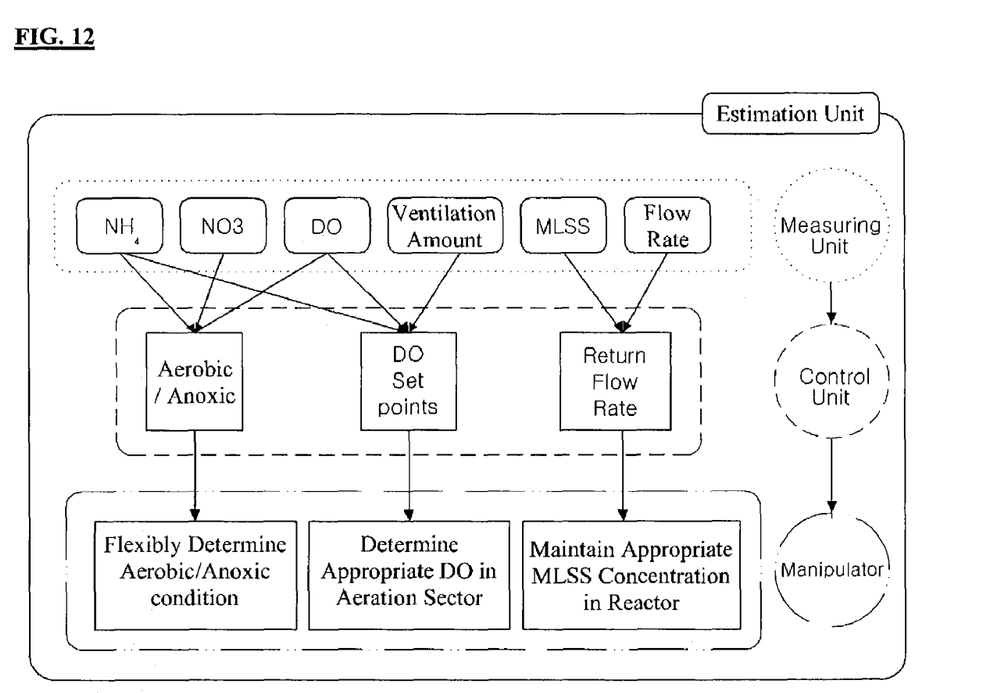
FIG. 12 is a view showing the configuration of an estimation unit of a tuning system in the sewage treatment apparatus according to one example.

FIG. 12 is a view showing the configuration of an estimation unit of a tuning system in the sewage treatment apparatus 108 according one example. The estimation unit includes a measuring unit, which is composed of sensors for measuring $NH_4$, $NO_3$, $PO_4$, DO, (dissolved oxygen) the ventilation amount, mixed liquid suspended solids (MLSS), a flow rate, and the like; controllers for controlling an aerobic/anoxic state, a DO setting point, a return flow rate, and the like; and actuators controlled to be actuated by the controller. Here, the aerobic/anoxic state controller is controlled by the information on $NH_4$, $NO_3$, $PO_4$, DO, and the like, while the DO setting point controller is controlled by the information on $NH_4$, DO, the ventilation amount, and the like. Further, the return flow rate controller is controlled by the information on the MLSS, the flow rate, and the like.

In addition, each actuator flexibly determines the aerobic/anoxic condition, determines an appropriate DO value in an aeration sector, or maintains an appropriate MLSS (mixed liquor-suspended solid) concentration in a reactor.

As described above, the new control logic extracted according to the simulation results is transmitted to the water quality monitoring control system to control the water quality monitoring control system in real time.

In addition to the DO measuring sensor, a hydrogen ion concentration (pH) sensor, an MLSS sensor, an ammonia nitrogen ($NH_4^+$—N) sensor, a nitrate nitrogen ($NO_3^-$—N) sensor, a phosphate phosphorous ($PO_4^-$—P) sensor, an oxidation reduction potential (ORP) sensor, and the like may be additionally installed as the measuring sensors installed in the biological reactors 210 and 220, and the respective sensors are always connected to the water quality monitoring control system on-line.

Meanwhile, the water quality monitoring control system, which separately controls the respective sectors of the biological reactors 210 and 220, is different from the conventional schemes in that the dissolved oxygen concentrations in all the aerobic sectors through all the treatment processes are identically maintained with a constant level (for example, at least 2.0 mg/L) or the air supply amount is controlled according to the occurrence or not of an aeration process or by a frequency modulation scheme.

In addition, a conventional water quality monitoring system, a control system, an expert control system, or the like has allowed a manager to directly control the system through the man & machine interface while it has communicated with a main server computer installed to the central position based on a conventional supervisory control and data acquisition (SCADA) which has been used to monitor and control a remotely installed apparatus and equipment in another remote position (such as the central position); or has been automatically operated by the previously inputted control logic. If an additional simulation is integrated, the simulation results would be presented to the operator as the operation method through a previously inputted similar scenario.

Accordingly, the conventional control system has no scheme capable of checking the occurrence or not of problems, so that a manager directly controls the control system. This is because the portion required to be controlled in the domestic advanced sewage treatment scheme is extremely small, so that the need to be controlled may be extremely low, and even if the real sewage treatment plant control system is installed, it has been no difference in operational manpower.

Meanwhile, the control system according to one example receives the information inputted from the sensors in real time, and the tuning system is allowed to produce the optimum control logic even when conditions such as external environmental changes, flow rate variations, and the like are varied according to the inputted information. Accordingly, the control system according to the present invention can cope with the sewage treatment environmental change quickly and flexibly, improve the treatment efficiency of organic materials, nitrogen and phosphorous to maintain the stable treated water quality, and reduce operational manpower to thereby reduce maintenance and management costs.

Referring to FIGS. 13(a) to (d) which show an application example of the sewage treatment apparatus 108 according to one example, the sewage treatment method according to one example will be described as follows.

Figure 13:
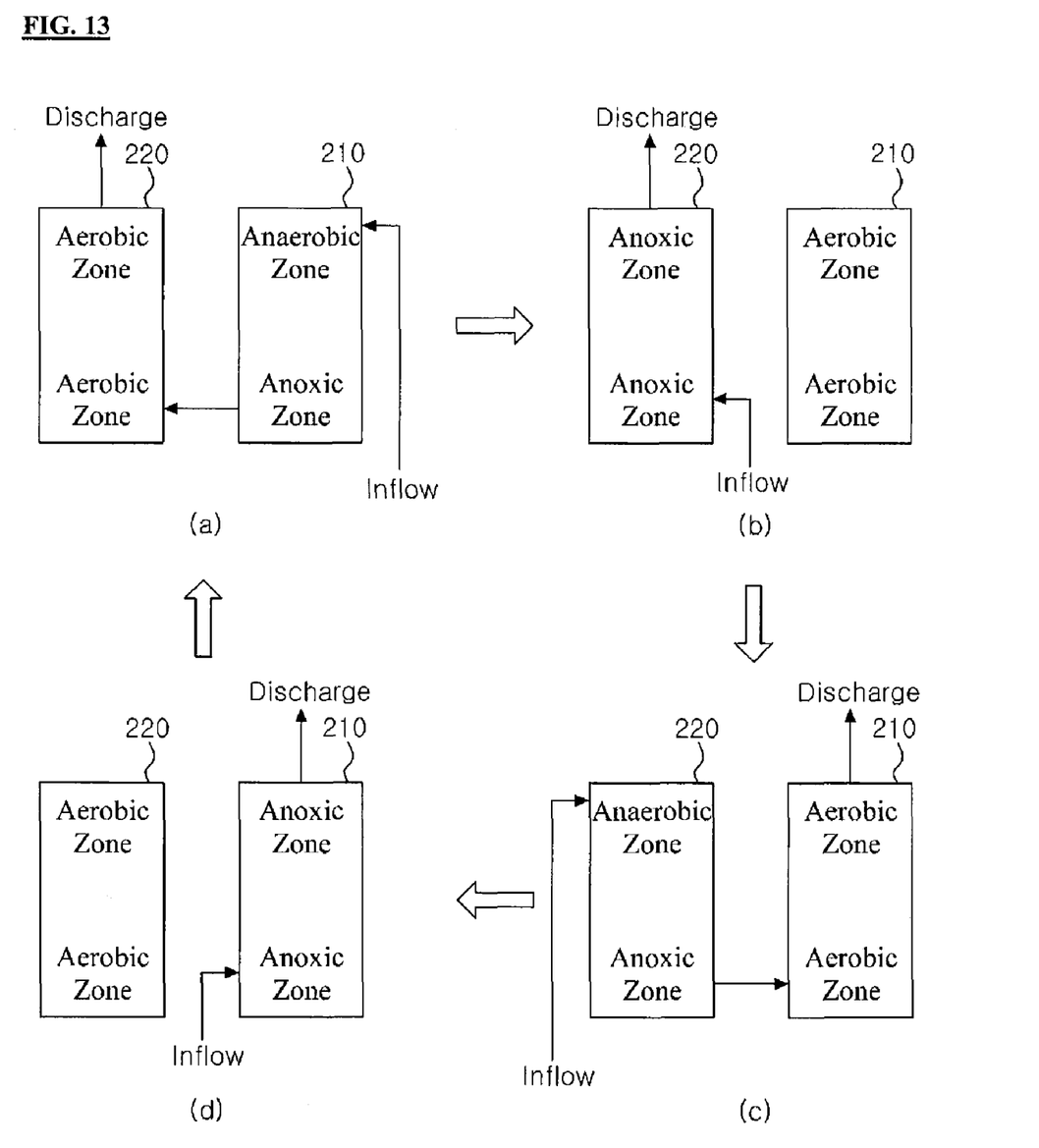
FIG. 13 is a view showing an application example of the sewage treatment apparatus according to the one example.

First of all, as shown in FIG. 13(a), the sewage and return activated sludge is introduced into the lower end of the first biological reactor 210. The sewage and return activated sludge is introduced into the first biological reactor 210 under an anaerobic state where air is not supplied. At this time, the sewage and return activated sludge has not been completely mixed, so that it is moved in a plug-flow type. In addition, a middle portion and the upper end of the first biological reactor 210 are converted into an anoxic state.

Meanwhile, the second biological reactor 220 maintains the aerobic state and discharges the completely treated sewage.

Then, if a predetermined time goes by, the inflow of the sewage into the first biological reactor 210 stops as shown in FIG. 13(b). Then, the sewage and return activated sludge is introduced into the upper end of the second biological reactor 210 220. At this time, the upper and lower ends and the middle portion of the first biological reactor 210 are supplied with air, so that they may be converted into an aerobic state.

Meanwhile, the upper and lower ends and the middle portion of the second biological reactor 220 are not supplied with air, so that they may be converted into an anoxic state to discharge the treated sewage.

Then, if a predetermined time goes by, the inflow of the sewage and return activated sludge into the upper end of the second biological reactor 220 is blocked as shown in FIG. 13(c) while the sewage and return activated sludge is introduced into the lower end of the second biological reactor 220. At this time, the sewage and return activated sludge has not been completely mixed, so that it is moved in a plug-flow type. In addition, the middle portion and the upper end of the second biological reactor 220 are converted into an anoxic state. Further, the first biological reactor 210 is converted into an aerobic state, and the completely treated sewage is discharged.

Then, if a predetermined time goes by, the inflow of the sewage into the lower end of the second biological reactor 220 is blocked as shown in FIG. 13(d). Then, the sewage and return activated sludge is introduced into the upper end of the first biological reactor 210.

At this time, the upper and lower ends and the middle portion of the first biological reactor 210 are converted into an anoxic state. Then, the completely treated sewage is discharged. Further, the upper and lower ends and the middle portion of the second biological reactor 220 are converted into an aerobic state.

As described above, the treatment time for the respective stages is changed depending on the load of the inflow sewage water, and it is possible to increase the treatment time for the respective stages or to omit the respective stages.

Meanwhile, in the stage before the sewage is introduced into the biological reactors 210 and 220, the biological reactors 210 and 220 are maintained in the aerobic state and remove organic material therefrom. Further, through a nitrification process in which ammonia nitrogen ($NH_4^+$—N) is converted into nitrate nitrogen ($NO_3^-$—N), the sewage and return activated sludge to be treated is introduced with nitrate nitrogen ($NO_3^-$—N) accumulated therein and a diffusion process is performed. At the same time, a denitrification process for nitrate nitrogen ($NO_3^-$—N) is performed.

Meanwhile, referring to the Manual Nitrogen Control (993) proposed by EPA, a main factor in a denitrification process is a ratio of food to microorganism, an F/M ratio, and a specific denitrification rate (SDNR) and an F/M ratio are proportional with each other.

Conventionally, the SDNR may be equal to the sum of 0.03 times the F/M ratio and 0.029 as expressed in Equation 1:

$$SDNR = 0.03\frac{F}{M} + 0.029 \qquad \text{Equation 1}$$

Accordingly, the sewage and the sludge react with each other under the complete mixing state in a conventional $A^2/O$, intermittent aeration or SBR method, the amount of organic materials (F) in the inflow water is reduced while the amount of microorganism (M) is constant, so that the low F/M ratio may be maintained. Accordingly, as a carbon source is deficient, the carbon source is preferentially used in bioaccumulation or cell synthesis rather than an actual denitrification process, so that the elongated hydraulic retention time has been required in order to improve the denitrification efficiency since the carbon source has been absolutely deficient.

On the contrary, in order to maintain the F/M ratio constantly at a high level, the system, in one example, controls the amount of the return activated sludge, so that the return activated sludge may be mixed with the inflow water or introduced into another position which is different from that of the inflow water, thereby maintaining the high F/M ratio by controlling the MLSS in an anoxic state. The activated sludge in the biological reactors 210 and 220 is appropriately mixed with the sewage in the biological reactors 210 and 220 without being completely settled in the biological reactors 210 and 220, so that it may be diffused in an ideal plug-flow type. Accordingly, the activated sludge is in contact with a large quantity of nitrate nitrogen ($NO_3^-$—N) in the biological reactors 210 and 220 using the inflow sewage, so that the denitrification process can be performed.

At this time, the high F/M ratio causes the denitrification process to be performed more quickly than the complete mix reaction, so that the hydraulic retention time in the anoxic (zone) state can be dramatically reduced. The most important control factor in the process is a dissolved oxygen concentration in an aerobic state before the introducing stage and a scheme for preventing microorganism from being settled in the time point from which air is not supplied and in an anaerobic/anoxic state. It is generally known that if the dissolved oxygen concentration in the biological reactors 210 and 220 is not smaller than 0.2 mg/L, oxygen is actuated as an electron receiver, so that the actual denitrification process may not be performed. Accordingly, if a high dissolved oxygen concentration is maintained in an aerobic state, a large amount of time is required between the time point from which air is no more supplied and the time point in which the dissolved oxygen concentration is reduced smaller than or equal to 0.2 mg/L.

Specifically, a contact ratio between microorganisms and various pollutant materials in the biological reactors 210 and 220 is dramatically reduced since the stirring operation is not performed, so that the dissolved oxygen concentration in the biological reactors 210 and 220 cannot be reduced smaller than or equal to 0.2 mg/L.

Further, if the dissolved oxygen concentration maintains to be not smaller than 0.2 mg/L, organic materials in the inflow water are connected with the oxygen in the biological reactors 210 and 220, so that organic materials required to the denitrification process is remarkably deficient, and therefore, the denitrication rate has had no choice but to be maintained very low. Due to the aforementioned problem, the dissolved oxygen concentration in the aerobic state is maintained to be not smaller than 2.0 mg/L, and therefore, a large amount of the organic material introduced after the time point from which air is not supplied may not be used to perform the denitrification process, the anaerobic/aerobic scheme according to the time control scheme in a conventional intermittent air supply process represents very low nitrogen removing efficiency.

In order to solve these problems, an on-line dissolved oxygen measuring sensor is installed to each sector of the diffusers 230 which are separately installed to the lower portions of the biological reactors 210 and 220. In addition to the on-line dissolved oxygen measuring sensor, an on-line pH sensor, an MLSS sensor, an ammonia nitrogen ($NH_4^+$—N) sensor, a nitrate nitrogen ($NO_3^-$—N) sensor, a phosphate phosphorous ($PO_4^-$—P) sensor, an oxidation reduction potential (ORP) sensor, and the like may be further installed to monitor a state of the biological reactors 210 and 220. At this time, according to the preset values, the water quality monitoring system separately controls the occurrence or not of aeration process and a dissolved oxygen concentration in the respective aerobic states using the concentrations of the respective pollutant materials measured in real time. At this time, the dissolved oxygen concentration in the aerobic states are maintained in the range of 0.5 mg/L to 2.0 mg/L, but the respective dissolved oxygen concentrations in all the aerobic states are different from each other.

The actual limitation factor in the nitrification process is the maximum specific growth rate $\mu_N$ of microorganism, which is influenced by temperature. Such a fact may be known from the Manual Nitrogen Control (1993) ($\mu_N=0.47e^{0.098(temperature-15)}$) which has been proposed by EPA.

Accordingly, by injecting the minimum amount of air required to an oxidation and nitrification process of organic materials, unnecessary energy can be cut down to reduce operation cost.

The conventional sewage treatment methods have strictly prevented air from being supplied since air supply in an anaerobic or anoxic (zone) state causes the nitrification efficiency to be reduced. Further, in order to maintain the dissolved oxygen concentration in the biological reactor to be smaller than or equal to 0.2 mg/L, the conventional sewage treatment methods have maintained a mixer at a low speed, so that an increase of the dissolved oxygen concentration due to a re-aeration process on a surface of the biological reactor might have been prevented.

However, this is because the dissolved oxygen concentration in an anaerobic or anoxic state increases due to the dissolved oxygen included in the internal recycle water, and therefore, if the dissolved oxygen concentration in the internal recycle water is maintained to be low and air is instantaneously introduced, the dissolved oxygen concentration in the biological reactor does not increase.

Therefore, since the microorganisms in the biological reactor in an anaerobic/anoxic state are quickly settled in an example of sewage treatment method, the contact rate of the microorganisms with the nitrite nitrogen in the biological reactor 210 and 220 may be reduced. Accordingly, a small amount of air is instantaneously supplied through the diffusers located at the lower portions according to the microorganism concentration in biological reactor which has been previously set in the monitoring system, so that the microorganisms can be prevented from being quickly settled.

At this time, in order to prevent the plug-flow from being disintegrated due to the air supply in an anaerobic/anoxic state, air is sequentially supplied through only some lines of the installed diffusers rather than the whole lower aeration, and if the high-concentrated microorganisms are secured, so that when the sludge is little settled, air may not be supplied.

The air supply is primarily controlled using the monitoring system, and the tuning system determines whether or not the air supply is controlled.

The sewage treatment control device and method and the sewage treatment system using the same according one example as described above, have advantages, in that when a sensor in a measuring unit is abnormally operated, one may know whether or not a measured value from the sensor is abnormal; when an expensive measuring unit for measuring a specific component is out of order, an inexpensive measuring unit for measuring another specific component may be used to convert a target value, so that the expensive measuring unit may be replaced with the inexpensive measuring unit, thereby dramatically reducing the installation cost for the measuring units; in addition the number of measuring units may be minimized, whereby the maintenance may be easily performed; the occurrence of failure may be minimized; and although any one of the measuring units is out of order, another measuring unit may be used to perform the measurement continuously, so that there is no need to be manually operated, thereby being capable of securely and precisely controlling the sewage treatment process. In addition, the sewage treatment control device, method and system may be commonly applied to the sewage treatment process; implement the best control conditions; and minimize the maintenance time and the maintenance manpower associated therewith to thereby reduce a budget. Further, when an activated sludge method is modified into an advanced treatment construction, the sewage treatment control device, method and system need not install additional internal partition walls, thereby dramatically reducing a construction interval and preventing the neighboring river from being polluted during the construction interval. Furthermore, the respective biological reactors may be converted into an anaerobic state, an anoxic state and an aerobic state, and the respective states may coexist, so that the space applicability is excellent. Moreover, the dissolved oxygen concentrations in the respective sectors in an aerobic state may be separately controlled in a region of 0.5 mg/L to 2.0 mg/L, so that the operational cost can be reduced. In addition, a portion through which sewage is introduced is maintained in an anoxic state of a plug-flow type, so that the denitrification rate is improved, and therefore, the high-level denitrification may cause a phosphorous emission rate to be improved. Further, using a water level adjustment apparatus capable of adjusting an opened height of a discharge port without additionally using both the stir and the internal recycle by an internal recycle pump, the operation cost can be dramatically reduced. Also, an on-line water quality measuring unit is installed in the biological reactor, so that the water quality in the biological reactor can be checked in real time. The water quality monitoring control system for controlling the biological reactor depending on the previously inputted control logic is installed, and the tuning system for monitoring, controlling, diagnosing and anticipating an operational state of the water quality monitoring control system is used to manage the water quality monitoring control system, so that the operation efficiency of the sewage treatment apparatus can be improved.

Although the sewage treatment control device and method according to these examples are described with reference to the illustrated drawings, the scope of the sewage treatment control device, method and system is not limited to the embodiments described above and the drawings. It will be apparent that those skilled in the art can make various modifications and changes thereto within the scope of the invention defined by the claims.

Alternative combinations and variations of the examples provided will become apparent on this disclosure. It is not possible to provide specific examples for all of the many possible combinations and variations of the embodiments described, but such combinations and variations may be claims that eventually issue.

What is claimed is:

1. A sewage treatment control device comprising:
   measuring units having sensors for inspecting specific components in water, respectively;
   validity verification units connected to the measuring units to determine validities for measured component values, respectively;
   target value setting units connected to the validity verification units to set target values for the component values measured in the measuring units, respectively;
   a manual setting unit for setting a target value depending on a component value inputted by an operator;
   a signal selection unit for allowing either one of the respective target value setting units or the manual setting unit to be connected;
   a proportional-integral-derivative control unit for performing proportional, integral or derivative action for the target value inputted from the signal selection unit to convert the target value into a control signal; and
   a manipulation unit for manipulating a sewage treatment apparatus depending on the control signal converted in the proportional-integral-derivative controller control unit.

2. The sewage treatment control device of claim 1, wherein the validity verification unit determines the validities by comparing whether the signals for the measured component values satisfy a predetermined voltage, a predetermined variation range, a predetermined variation rate or the variation number in a predetermined period of time.

3. The sewage treatment control device of claim 1, wherein the target values are operational conditions set to treat sewage depending on the measured component values.

4. The sewage treatment control device of claim 1, wherein the signal selection unit includes a selection logic unit which controls to allow one of the target value setting units, which has a component value determined to be valid in the respective validity verification units, or the manual setting unit to be connected.

5. The sewage treatment control device of claim 4, wherein the selection logic unit controls to select one of the target value setting units depending on a predetermined priority ranking.

6. A sewage treatment control method, comprising the steps of:
   inspecting specific components of water;
   determining validities for component values measured in the step of inspecting;
   setting target values for the component values;
   selecting a target value for a component value determined to be valid in the step of determining validities;
   converting the target value selected in the selecting step into a control signal; and
   manipulating a sewage treatment apparatus depending on the control signal converted in the converting step.

7. The sewage treatment control method of claim 6, wherein the step of inspecting is performed by respective sensors for inspecting the specific components of water.

8. The sewage treatment control method of claim 6, wherein the step of setting target values is performed by setting operational conditions for sewage-treating the specific components inspected in the step of inspecting.

9. The sewage treatment control method of claim 6, wherein in the step of determining validities, the validities is determined by comparing whether the signals for the measured component values satisfy a predetermined voltage, a predetermined variation range, a predetermined variation rate or the number of variations in a predetermined period of time.

10. A sewage treatment system, comprising:
    a sewage treatment apparatus including at least two biological reactors wherein each of
       the biological reactors being respectively connected to inflow and discharge portions, the biological reactors respectfully being formed with a channel for allowing each of the reactors to communicate with the other;
       diffusers installed to lower portions of the respective biological reactor to selectively supply air so that each biological reactor is changed into one of an anaerobic zone state, an anoxic state and an aerobic state; and
       water level adjustment devices respectively installed to the discharge portions of the biological reactor to adjust closing/opening of the discharge portions to change a flow path; and
    a sewage treatment control device comprising:
       measuring units having sensors for inspecting specific components in water, respectively;
       validity verification units connected to the measuring units to determine validities for measured component values, respectively;
       target value setting units connected to the validity verification units to set target values for the component values measured in the measuring units, respectively;
       a manual setting unit for setting a target value depending on a component value inputted by an operator;
       a signal selection unit for allowing either one of the respective target value setting units or the manual setting unit to be connected;
       a proportional-integral-derivative control unit for performing proportional, integral or derivative action for the target value inputted from the signal selection unit to convert the target value into a control signal; and
       a manipulation unit for manipulating the sewage treatment apparatus depending on the control signal converted in the proportional-integral-derivative control unit.

* * * * *